Nov. 2, 1937.  W. A. McLEAN  2,098,102
OIL FILTER
Filed June 26, 1933
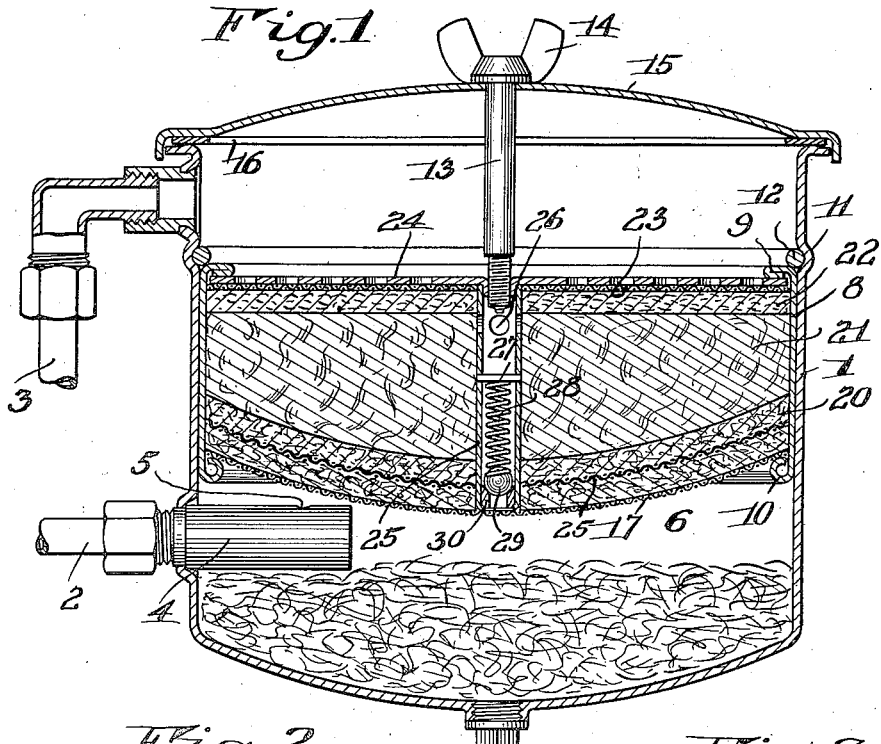
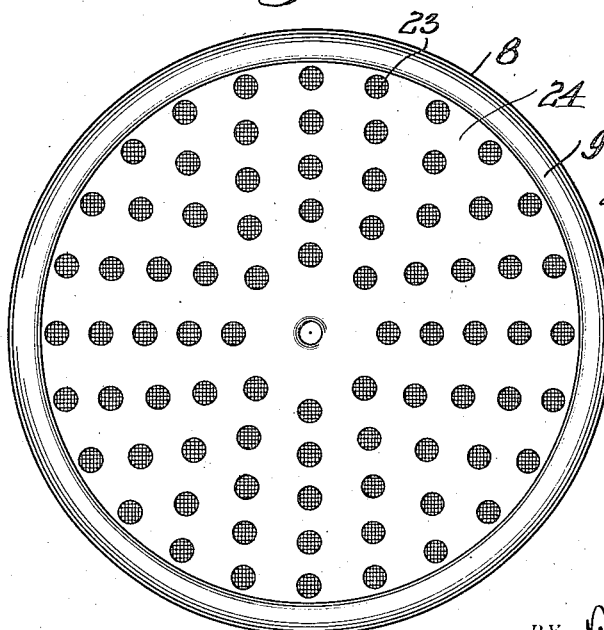
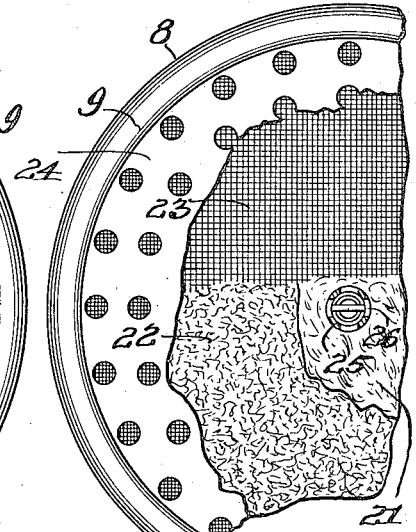
INVENTOR
William A. McLean
BY
his ATTORNEY

UNITED STATES PATENT OFFICE 2,098,102

OIL FILTER

William A. McLean, Rochester, N. Y., assignor to C. Schnackel's Son, Inc., Rochester, N. Y., a corporation of New York Application June 26, 1933, Serial No. 677,647

1 Claim. (Cl. 210—134)

My present invention relates to filtering apparatus and more particularly to oil filters for cleansing the circulatory oiling systems of internal combustion and other engines. My two prior applications, Serial No. 549,963, filed July 10, 1931, and Serial No. 658,696, filed February 27, 1933, deal with this type of filter. The general scheme involves a container having intake and delivery force feed connections. The filtering unit is interposed therebetween. The general object of my present invention is to provide a simple, inexpensive and more greatly efficient filtering unit of this character and, more particularly, such a filtering unit embodying a self-sustained filtering cartridge that may be readily inserted in the filtering container and removed and replaced when fouled after a period of use. The improvements are directed in part toward providing a combination of filtering mediums that best act together to effect a satisfactory filtering function while at the same time postponing fouling by impurities in the oil to a maximum degree. The improvements further provide an arrangement whereby a fouled cartridge or unit requiring replacement, if ignored as to its condition and left to still operate in a circulatory system, is made to yield to the transmission of the oil, such as it is, until the situation is remedied so that the moving parts of the engine so served for lubrication will not be denied lubrication altogether. To these and other ends, the invention resides in certain improvements and combinations of parts, all as will be hereinafter more fully described, the novel features being pointed out in the claim at the end of this specification.

In the drawing:

Fig. 1 is a central vertical section through a lubricating apparatus fitted with a cartridge filter constructed in accordance with and illustrating one embodiment of my invention;

Fig. 2 is a plan view of the filtering cartridge attached, and

Fig. 3 is a similar fragmentary view with parts broken away to show fragmentary plans of the superposed elements of which the cartridge is composed.

Similar reference numerals throughout the several views indicate the same parts.

Referring more particularly to the drawing, I have chosen to illustrate in Fig. 1 an oil filter of the general type also illustrated, described and claimed in my two prior patent applications hereinabove referred to. Reference having been so made to them, it is sufficient to here explain that such a lubricator comprises a casing 1 having an oil intake pipe 2 leading from the oil pump or similar circulatory source and an outlet pipe 3 leading to the bearings or other parts of the engine to be lubricated. The inlet pipe 2 through suitable fittings delivers the oil to a pressure valve casing 4, the details of which are not important herein, from which it escapes at 5 to a lower chamber 6 in the casing 1. Such oil, after being filtered, passes from an upper chamber 7 through suitable connections to the said outlet pipe 3. The filtering cartridge or unit with which this invention is concerned is interposed between the chambers 6 and 7 and is constructed generally, as follows:

It is enclosed within a casing 8 of cartridge paper that may be similar to that of a shotgun shell crimped over at top and bottom, as indicated at 9 and 10, and slidably insertable in and withdrawable from the filter can or casing 1. The latter has a spun bead 11 that provides on the interior an annular recess or seat for a removable spring locking ring 12 engaging the bead 9. A bolt 13 having a manually operable exteriorly arranged winged head 14 extends through a cover 15 and threads into the filter cartridge in a manner hereinafter explained. This bolt thus, with the aid of a gasket 16, holds such cover tightly clamped in place on the rim of the can and after the removal of the cover the bolt may be used something like the ordinary cork screw to remove the cartridge unit from the can as taught in my prior applications referred to.

Coming now to the details of the cartridge itself, the casing 8 thereof contains the following superposed bodies in laminated arrangement in the order named from bottom to top, that is, in the direction of oil flow from chamber 6 to chamber 7: a convex wire mesh screen 17 resting on beads 5; a felt body 18; another wire mesh 19; another felt body 20; a central fibrous body, such as cotton batting, 21; a compressed paper pulp body 22, such as the substance known as "German beer filter"; a woven wire mesh 23 and a metallic foraminous diaphragm 24 engaging bead 9.

The action of the oil, so far as this composite unit is concerned, is that, as to the larger solid substances that it carries, it is strained through the bottom gauze 17, the convexity of which as well as that of the next adjacent elements affords a larger initial entering surface. The felts 18 and 20 thereafter strain out the next larger particles. The large fibrous body 21 effects the major straining whereafter the relatively dense body of paper pulp 22 finally frees the oil of all the finer remaining impurities. The oil then escapes through the foraminous confining diaphragm 24. The purpose of the screen mesh 23 underlying the latter is to permit a maximum volume of oil to exude from the entire surface of paper body 22 and effect exit through the openings in diaphragm 24 where otherwise the delivery from 22 to 24 would be confined to the relatively small combined areas of the openings in the foraminous plate. It at the same time prevents the paper body from forcing itself, under the oil pressure, into these openings. With such an arrangement, a graduated sequence of elements is provided that purifies the oil stream without concentrating the foreign matter removed within any particular area or region.

Of course, it is contemplated that at proper intervals after the filter cartridge has inevitably become fouled after continuous use it should be removed and replaced by a new one. However, lack of attention in this respect might lead to the cartridge becoming so impregnated with foreign matter that an adequate supply of oil, either dirty or refined, would not be delivered to the engine parts which, after all, are better off with dirty oil than with no oil at all. My invention provides for this contingency, through the incorporation in the filter cartridge or unit, of a pressure valve that yields to a backed up pressure of oil and allows its passage from chamber 6 to chamber 7 without filtering in such an emergency. As illustrated, this valve arrangement embodies a metallic tube 25 running centrally through the cartridge from top to bottom except for the mesh screen 17 at the bottom and a connection at the top with diaphragm 24 in which bolt 13 is screwed. It has ports 26 at the top delivering independently of the filtering mediums and an intermediate pin or abutment 27 against which reacts a spring 28 that forces a ball valve 29 normally against a seat in the bottom of the tube supplied by a tubular plug 30. Normally the pressure in chamber 6 is not sufficient to unseat this valve, but when the resistance through the filtering bodies becomes too great it is unseated and allows the direct flow of oil to chamber 7.

I claim as my invention:

In a force feed oil filter, the combination with a tank having a discharge connection and an intake connection and provided with a recessed seat in its inner wall, of a detachable spring ring of circular cross section held to the seat in the tank wall by its own expansive force and itself forming a seat on the interior of the tank, a light cartridge adapted to act as a unitary, perishable and replaceable filtering element detachably arranged between the connections, the same comprising an inner compacted filtering medium and a cylindrical paper casing permanently enclosing the same and having its ends crimped inwardly over the filtering medium at the ends of the cylinder in the manner of a shotgun shell, the crimped end of the cartridge being forced against the said ring seat by the pressure of oil from the intake connection in a manner tending to tighten the crimping.

WILLIAM A. McLEAN.